United States Patent
Blinder et al.

(10) Patent No.: US 11,277,633 B2
(45) Date of Patent: Mar. 15, 2022

(54) METHOD AND APPARATUS FOR COMPENSATING MOTION FOR A HOLOGRAPHIC VIDEO STREAM

(71) Applicants: Vrije Universiteit Brussel, Brussels (BE); IMEC vzw, Heverlee (BE)

(72) Inventors: David Blinder, Antwerp (BE); Colas Schretter, Brussels (BE); Peter Schelkens, Willebroek (BE)

(73) Assignee: Vrije Universiteit Brussel, Brussels (BE)

( * ) Notice: Subject to any disclaimer, the term of this patent is extended or adjusted under 35 U.S.C. 154(b) by 0 days.

(21) Appl. No.: 16/965,493

(22) PCT Filed: Feb. 1, 2019

(86) PCT No.: PCT/EP2019/052554
§ 371 (c)(1),
(2) Date: Jul. 28, 2020

(87) PCT Pub. No.: WO2019/149915
PCT Pub. Date: Aug. 8, 2019

(65) Prior Publication Data
US 2021/0058639 A1    Feb. 25, 2021

(30) Foreign Application Priority Data
Feb. 1, 2018  (EP) .................... 18154795

(51) Int. Cl.
*H04N 19/52* (2014.01)
*G02B 27/01* (2006.01)
(Continued)

(52) U.S. Cl.
CPC ......... *H04N 19/52* (2014.11); *G02B 27/0103* (2013.01); *G02B 27/0172* (2013.01);
(Continued)

(58) Field of Classification Search
None
See application file for complete search history.

(56) References Cited

U.S. PATENT DOCUMENTS 5,430,480 A    7/1995  Allen et al.
10,380,804 B1 *  8/2019  Pintaric .............. H04N 5/23212
(Continued)

OTHER PUBLICATIONS

European Search Report from European Application No. 18154795.1 (filed Feb. 1, 2018), dated Apr. 20, 2018.
(Continued)

*Primary Examiner* — Talha M Nawaz

(57) ABSTRACT

The invention pertains to a computer-implemented method for compensating motion for a digital holographic video stream, the method comprising: obtaining (1010) a sequence of frames representing consecutive holographic images of a scenery; obtaining (1020) translation and rotation vectors describing a relative motion of at least one object in said scenery between a pair of frames from among said sequence of frames; and applying (1030) an affine canonical transform to a first frame of said pair of frames so as to obtain a predicted frame, said affine canonical transform representing said translation and rotation vectors. The invention also pertains to a computer program product and to an apparatus for compensating motion for a digital holographic video stream.

20 Claims, 2 Drawing Sheets

(51) Int. Cl.
*H04N 19/172* (2014.01)
*H04N 19/60* (2014.01)
*H04N 19/80* (2014.01)
*G06F 3/01* (2006.01)
*G06T 19/00* (2011.01)

(52) U.S. Cl.
CPC .............. *G06F 3/012* (2013.01); *G06F 3/017* (2013.01); *G06T 19/006* (2013.01); *H04N 19/172* (2014.11); *H04N 19/60* (2014.11); *H04N 19/80* (2014.11); *G02B 2027/0174* (2013.01)

(56) References Cited

U.S. PATENT DOCUMENTS

| | | | | |
|---|---|---|---|---|
| 10,429,923 | B1* | 10/2019 | Johnston | G02B 27/0176 |
| 10,834,391 | B2* | 11/2020 | Chou | H04N 19/177 |
| 2013/0308956 | A1* | 11/2013 | Meyers | H04B 10/70 |
| | | | | 398/130 |
| 2014/0071229 | A1* | 3/2014 | Weerasinghe | H04N 21/816 |
| | | | | 348/40 |
| 2016/0239080 | A1* | 8/2016 | Margolina | G06F 3/017 |
| 2017/0208292 | A1* | 7/2017 | Smits | G01S 3/00 |
| 2017/0318308 | A1* | 11/2017 | Lu | H04N 19/10 |
| 2019/0132504 | A1* | 5/2019 | Fowers | H04N 5/23206 |
| 2020/0142356 | A1* | 5/2020 | Gilles | G02B 27/0172 |

OTHER PUBLICATIONS

International Search Report and Written Opinion from PCT Application No. PCT/EP2019/052554 (filed Feb. 1, 2019), dated Apr. 24, 2019.

Yiu-fai Wong et al., "Compression of medical volumetric data in a video-codec framework," 1996 IEEE International Conference on Acoustics, Speech, and Signal Processing Conference Proceedings, vol. 4, Jan. 1, 1996, pp. 2128-2135.

* cited by examiner

METHOD AND APPARATUS FOR COMPENSATING MOTION FOR A HOLOGRAPHIC VIDEO STREAM

FIELD OF THE INVENTION

The present invention pertains to the field of holographic video, and in particular to the problem of compressing digital holographic video streams.

BACKGROUND

Digital holography is a technology that captures and reconstructs the complex-valued amplitude of a wavefront of light. Holographic display systems can account for all visual cues, such as depth perception, continuous parallax and cause no accommodation-vergence conflict. By displaying holograms in rapid succession, we get a holographic video.

High-quality digital holograms for visualization need resolutions with orders of magnitude more pixels than conventional photographic imagery. Compounding this fact with video frame rates results in huge data volumes that need to be compressed efficiently. A core building block of video coders is motion compensation, which models motion between frames as to decorrelate subsequent video frames. Conventional video codecs only account for in-frame translational motion, which is inadequate for holograms due to their very different signal properties and thus bring little to no performance gains.

Yafei Xing et al., "Compression of computer generated phase-shifting hologram sequence using AVC and HEVC", Proc. *SPIE* 8856, *Applications of Digital Image Processing XXXVI*, 2013, discloses a simulation of phase-shifting digital holography (PSDH) interferometry, in which interference patterns between illuminated three dimensional (3D) virtual objects and the stepwise phase changed reference wave are generated as digital holograms. The hologram sequences are obtained by the movement of the virtual objects and compressed by AVC and HEVC.

T. Senoh et al., "Multiview image and depth map coding for holographic TV system", *Opt. Eng.* 53(11), 2014, proposes a holographic TV system based on multiview image and depth map coding and the analysis of coding noise effects in reconstructed images. It states that it has been shown that the problem of the huge amount of data that must be transmitted can be solved by capturing a three-dimensional scene with multiview cameras, deriving depth maps from multiview images or directly capturing them, encoding and transmitting the multiview images and depth maps, and generating holograms at the receiver side. This method shows the same subjective image quality as hologram data transmission with about $1/57000$ of the data rate. Antonin Gilles, "Fast hologram synthesis methods for realistic 3D visualization", PhD Thesis, INSA, Rennes, 2016, investigates two novel algorithms for hologram synthesis, in order to get closer to real-time computation. First, it discusses a method that combines two approaches which complement one another: the point-source and wave-field approaches. Second, this hybrid method was further accelerated by removing temporal redundancies between consecutive frames of a 3D video. For each video frame, the algorithm detects changes in the scene and updates the hologram of only affected scene points. Since only small regions of the hologram are updated at each video frame, this method allows the computational burden to be dramatically reduced, enabling the computation of colorful video holograms at 60 frames per second. Other existing coding solutions either omit interframe predictions entirely, or convert the hologram into a representation resembling a light-field by dividing the holograms into small apertures. The latter approach causes strong speckle noise due to the small apertures, and only scarcely exploits inter-frame correlations.

Accordingly, there is a need for a way to provide interframe prediction tailored for holographic videos.

SUMMARY

According to an aspect of the present invention, there is provided a computer-implemented method for compensating motion for a digital holographic video stream, the method comprising: obtaining a sequence of frames representing consecutive holographic images of a scenery; obtaining translation and rotation vectors describing a relative motion of at least one object in said scenery between a pair of frames from among said sequence of frames; and applying an affine canonical transform to a first frame of said pair of frames so as to obtain a predicted frame, said affine canonical transform representing said translation and rotation vectors.

The present invention is based inter alia on the insight of the inventors that traditional motion compensation techniques as used in video compression algorithms yield very little compression when applied to holographic video streams, because typical motions of objects in a real, three-dimensional scenery—in particular rigid body translations and rotations—do not appear as mere translations and scaling in the two-dimensional holographic image plane.

The present invention is further based on the insight of the inventors that affine canonical transforms can be used to accurately predict the changes in two-dimensional holographic images resulting from relative motions in the imaged scenery, because motion in the three-dimensional scene will correspond to transformations of the hologram frames which can be modeled by four-dimensional affine canonical transforms.

The present invention is further based on the insight of the inventors that the transmission and reproduction of holographic sceneries for display in a head-mounted display to create virtual reality or augmented reality experiences benefit particularly from methods which improve video compression and processing in the presence of global motion, as movements of the viewer in such contexts can be considered equivalent to movements of the entire scenery.

The term "affine canonical transform" (ACT) is used herein to denote a superset of the linear canonical transforms (LCT) as known in the art (see J. J. Healy, M. A. Kutay, H. M. Ozaktas, and J. T. Sheridan, *Linear Canonical Transforms* Springer 2016), which models, among others, the rigid transformations in three-dimensional space (the special Euclidian group) in signal space.

In particular, denoting as $\mathfrak{A}$ a class of transforms in 2n-dimensional time-frequency space consisting of affine mappings, an ACT $\mathcal{M} \in \mathfrak{A}$ transforms every point p as follows:

$$\mathcal{M}: \mathbb{R}^{2n} \to \mathbb{R}^{2n} \text{ by } p \mapsto Sp+b$$

where every point $p=(x,\omega)^T$ has coordinates in space $x=(x_1, \ldots, x_n)^T$ and in frequency $\omega=(\omega_1, \ldots, \omega_n)^T$. The vector $b=(b_x, b_\omega)^T$ denotes a translation in space and a modulation in frequency, while S is an element from the symplectic matrix group $SP(2n, \mathbb{R})$.

The abovementioned transforms are referred to as affine canonical transforms to differentiate them from the well-known LCT which do not possess a translation b in most common definitions.

In an embodiment of the method according to the present invention, the applying of the affine canonical transform comprises the following steps: applying a Fourier transform to at least a part of the first frame; applying a first operation to the Fourier-transformed part of the first frame; applying an inverse Fourier transform to the Fourier-transformed part of the first frame to which the operation has been applied; and applying a second operation to said inversely Fourier-transformed part of said first frame.

The inventors have found that it is particularly efficient to apply at least part of the ACT in the frequency domain. Fourier transforms can efficiently be implemented in computers by means of FFT algorithms. All required operations in the spatial domain and the Fourier domain typically only consist of pointwise multiplications of the signal with phase-only functions.

In a particular embodiment, applying the first operation and/or applying the second operation comprises applying an all-pass filter.

In an embodiment, the method according to present invention further comprises: determining a residual between a second frame of said pair of frames and said predicted frame.

Assuming the receiving end (decoder) of the video stream has access to the first frame and the necessary motion parameters to apply the ACT so as to reconstruct the predicted frame, the residual is the only additional information that needs to be provided in order to correct the predicted frame so as to approximate the original second frame. It is an advantage of this embodiment that it provides a complete set of motion compensation parameters for holographic video compression.

In a particular embodiment, the method further comprises: outputting a compressed video stream comprising said first frame, a representation of said translation and rotation vectors, and said residual, wherein said first frame and/or said residual are compressed.

The inventors have found that the first frame and the residual are particularly suited for compression.

In a particular embodiment, the first frame and/or the residual are compressed by means of a conventional video encoding algorithm.

In a more particular embodiment, the conventional video encoding algorithm is H.265/HEVC.

According to an aspect of the present invention, there is provided a computer program product comprising code means configured to cause a processor, when executed, to perform the steps of the method described above.

The computer program product may be provided on a computer readable medium, such as an optical memory, a magnetic memory, a solid-state memory, and the like.

According to an aspect of the present invention, there is provided an apparatus for compensating motion for a digital holographic video stream, the apparatus comprising: a video input interface adapted to receive a sequence of frames representing consecutive holographic images of a scenery; processing means configured to: obtain translation and rotation vectors describing a relative motion of at least one object in said scenery between a pair of frames from among said sequence of frames; and apply an affine canonical transform to a first frame of said pair of frames so as to obtain a predicted frame, said affine canonical transform representing said translation and rotation vectors.

In an embodiment of the apparatus according to the present invention, the processing means is further configured to: determine a residual between a second frame of said pair of frames and said predicted frame; and the apparatus further comprises: an output interface adapted to output a compressed video stream comprising said first frame, a representation of said translation and rotation vectors, and said residual, wherein said first frame and/or said residual are compressed.

According to an aspect of the present invention, there is provided a use of the apparatus as described above to apply global motion compensation on a holographic video stream for display through a holographic virtual reality or augmented reality headset, the headset comprising a motion sensor, wherein said motion of said at least one object in said scenery is a global motion induced by a user's head movements, and wherein said translation and rotation vectors are obtained from measurements of said motion sensor.

The technical effect and advantages of embodiments of the computer program product and of the apparatus according to the present invention correspond mutatis mutandis to those of the corresponding embodiments of the method according to the present invention.

BRIEF DESCRIPTION OF THE FIGURES

These and other features and advantages of embodiments of the present invention will now be described in more detail with reference to the accompanying drawings, in which.

DESCRIPTION OF EMBODIMENTS

The present invention is based on the derivation, by the inventors, of a mathematical model of how 3D scene motion affects the holographic signal, and the use of this model to build a motion compensation framework that results in high coding gains. The proposed model was inspired by Linear Canonical Transforms (LCT), by mathematically describing all possible 3D motion (translations, rotations) as elements of a generalization of the LCT, namely affine canonical transformations (ACT) of time-frequency space.

The present invention may, for example, be used to apply global motion compensation on holographic virtual reality or augmented reality glasses, headsets, or other head-mounted displays (hereinafter, "the headset"), whereby the headset is equipped with a motion sensor. The holographic video stream for the headset may be generated and compressed by an external computer (colocated with the user, or connected to the headset via a network). The transmitted video stream is updated and compensated according to the method disclosed herein both in function of any relevant changes in the scenery, and of changes in the user's angle of view and position. As the displaying of the images in the headset only requires information on those parts of the scenery that the user can view, given her present angle of view and position, the amount of data to be transmitted to the headset is strongly reduced and less bandwidth will be needed (as compared to a transmission of the full hologram).

The headset performs decompression and ends up processing a much smaller amount of data than would be the case if the entire hologram were received. The headset may further be configured to locally compensate (minor) movements of the user, without requiring immediate interaction with the external computer.

Another exemplary use of the invention is the application of dynamic computer-generated holography, where only a subset of the data needs to be computed corresponding to the difference after the proposed motion compensation algorithm. This can significantly reduce calculation time and power consumption.

Figure 1:
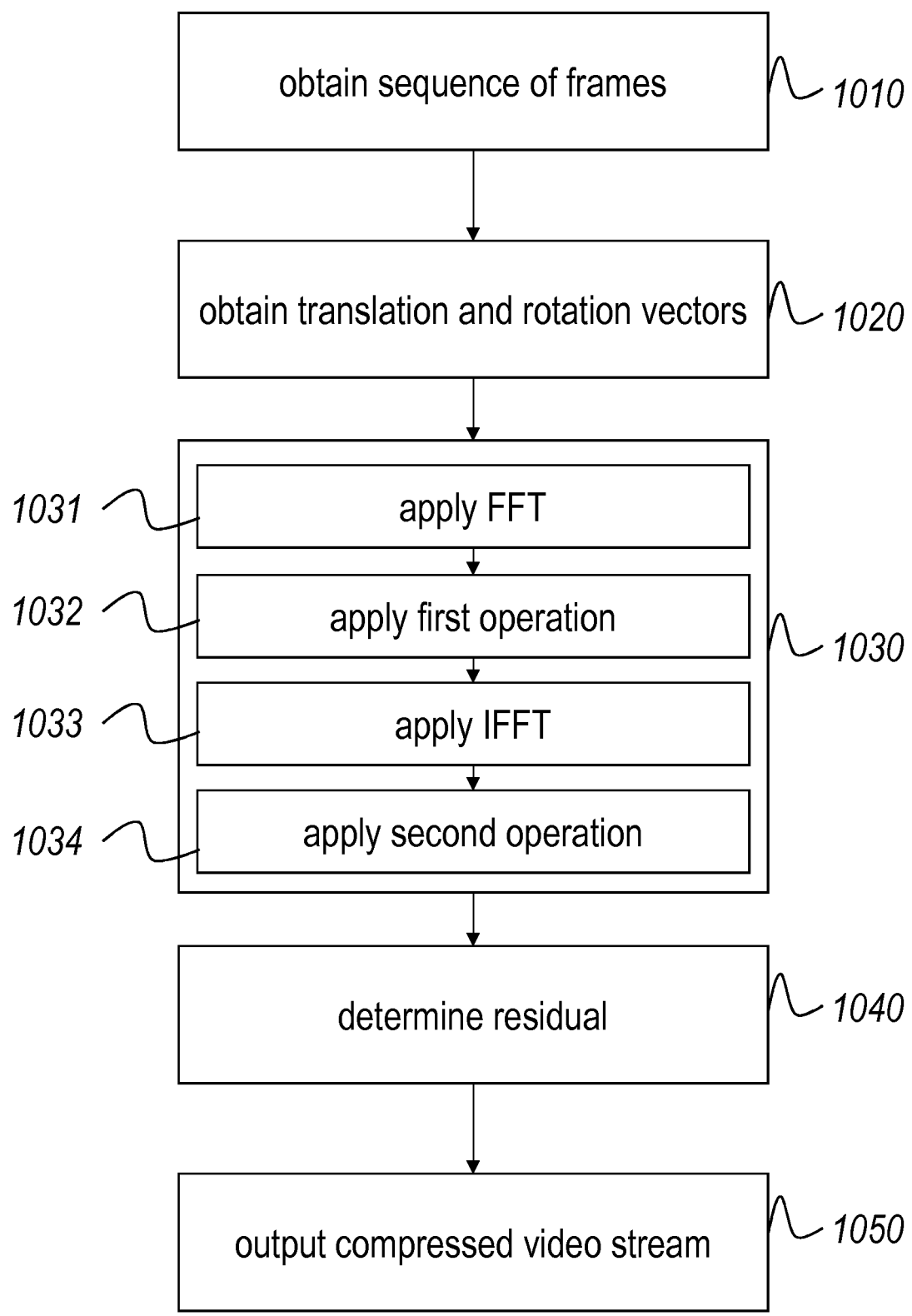
FIG. 1 presents a flow chart of an embodiment of the method according to the present invention.

FIG. 1 presents a flow chart of an embodiment of the method for compensating motion for a digital holographic video stream according to the present invention. The method is preferably computer-implemented, i.e. run on a programmable platform provided with appropriate hardware and software to carry out the steps described hereinbelow.

As the method operates on a holographic video stream, it begins by obtaining 1010 a sequence of frames representing consecutive holographic images of a scenery. The frames may be pre-stored and obtained from an external source (e.g. optically acquired holographic frames) over a network (e.g., a storage area network, a local area network, a wide area network such as the Internet, or the like), or synthesized by a computer.

Translation and rotation vectors describing a relative motion of at least one object in the scenery (or the entire scenery) between a pair of frames from among said sequence of frames are obtained 1020. In the case of synthetic holographic video, with a fixed position of the physical viewer, the complete motion information is available at the computer that generates the frames. Alternatively, the motion information can be straightforwardly obtained from a natural (multi-view) video sequence from which the holographic representation is derived. The invention works particularly well with global motion compensation, where motion of the entire scenery (or conversely, motion of the camera's point of view) is considered when determining the translation and rotation vectors. Alternatively or additionally, the motion compensation may be applied on a block-by-block basis. Without loss of generality, the remainder of the description will assume that the motion compensation is applied on a frame basis. Alternatively or additionally, the relative motion may also be generated by motion of a head-mounted display in a holographic virtual reality or augmented reality experience; any sensed motion of the head-mounted display is preferably fed in real time to the holographic video processor that produces the video feed for the head-mounted display.

In order to produce a predicted frame, an affine canonical transform is applied 1030 to a first frame of the pair of frames, whereby the affine canonical transform represents the translation and rotation vectors.

The application of the affine canonical transform may comprise the following steps:
- applying a 2D Fourier transform to at least a part of said first frame;
- applying a first operation to said Fourier-transformed part of said first frame; in particular, multiplying with a phase kernel according to the motion translation vector;
- applying an inverse Fourier transform to said Fourier-transformed part of said first frame to which said operation has been applied; and
- applying a second operation to said inversely Fourier-transformed part of said first frame; in particular, multiplying with a phase function for the rotation vector.

This embodiment is based on the insight of the inventors that all rigid body motions can be combined into a single rotation and translation operator. The subset of ACTs modeling all possible combinations of rigid body motions of can always be written as:

$$\tilde{x} = R_z(\psi) \cdot T_z(d) \cdot x + b$$

For some $\psi$, $d \in \mathbb{R}$ and $x, b \in \mathbb{R}^4$.
In the above equation, $$R_z(\psi) = \begin{pmatrix} R_2 & 0_2 \\ 0_2 & R_2 \end{pmatrix},$$

where $$R_2 = \begin{pmatrix} \cos\psi & \sin\psi \\ -\sin\psi & \cos\psi \end{pmatrix}$$

represents a rotation of the hologram around the z-axis (perpendicular to the hologram plane). $0_2$ is a 2×2 zero matrix.

Translations over a distance d along the z-axis can be modeled by Fresnel diffraction, which is a convolution; this reduces to a multiplication in Fourier space. Fresnel diffraction with wavelength $\lambda$ can be expressed as a shear in time-frequency-space:

$$T_z(d) = \begin{pmatrix} I_2 & \frac{2d}{\lambda} I_2 \\ 0_2 & I_2 \end{pmatrix}$$

where $I_2$ is a 2×2 identity matrix. It is further noted that small rotations around the x-axis and the y-axis (i.e., where $\sin\theta \approx \theta$ is valid) can accurately be approximated by a shift in Fourier space $b_\omega = (\theta_x, \theta_y)^T$, and translations in the x-y plane correspond to translations of the hologram, i.e. $b_x = (t_x, t_y)^T$. These shifts combine into the translation term b in the abovementioned equation.

Accordingly, only 2 FFTs are needed per frame: one for applying the transforms in Fourier space, and one to return to the spatial domain. All operations in the spatial domain and the Fourier domain will only consist of pointwise multiplications of the signal with phase-only functions, which is equivalent to the application of an all-pass filter; thus, all operations are numerically reversible.

When the predicted frame is available, a residual between a second frame of the pair of frames and the predicted frame may be determined 1040. A compressed video stream comprising said first frame, a representation of said translation and rotation vectors, and said residual, may then be output 1050. In the compressed video stream, the first frame and/or the residual are compressed, preferably by means of a conventional video encoding algorithm such as H.265/HEVC.

Figure 2:
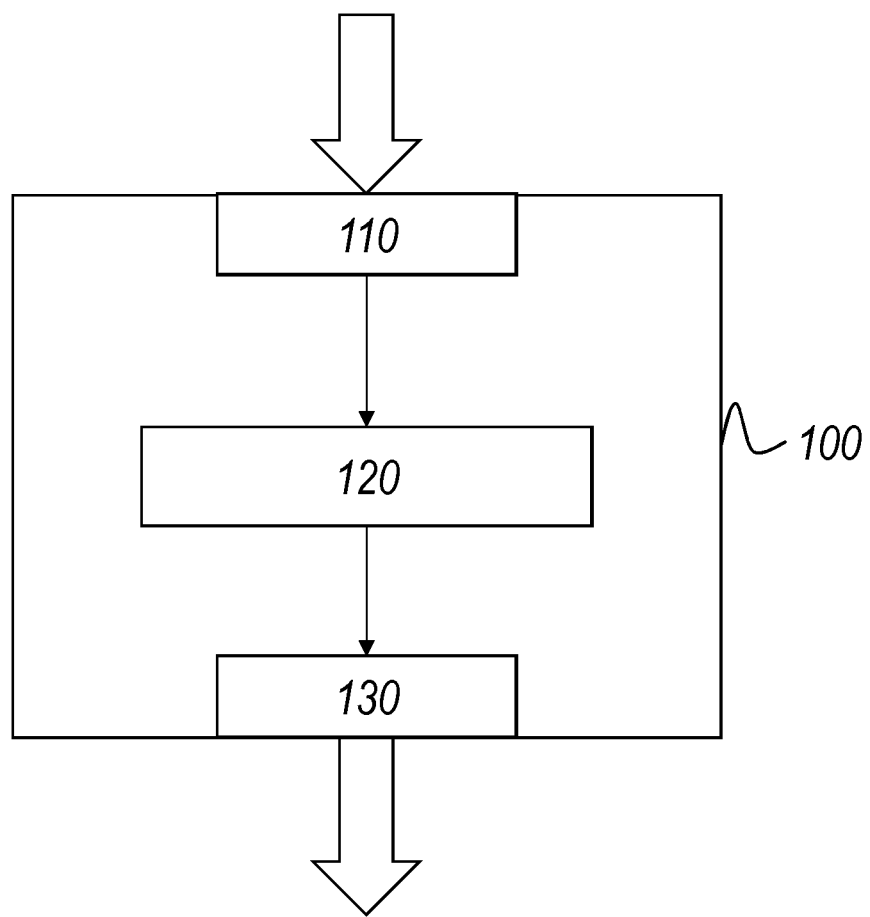
FIG. 2 presents a block diagram of an embodiment of the apparatus according to the present invention.

FIG. 2 presents a block diagram of an embodiment of the apparatus for compensating motion of a holographic video stream, according to the present invention.

The apparatus 100 comprises a video input interface 110 adapted to receive a sequence of frames representing consecutive holographic images of a scenery. The term "interface" is used to designate an appropriate combination of hardware and software that allows the apparatus to receive or transmit a video stream according to an applicable protocol, preferably a standardized protocol.

The apparatus 100 further comprises processing means 120 configured to obtain translation and rotation vectors describing a motion of at least one object in said scenery between a pair of frames from among said sequence of frames; and apply an affine canonical transform to a first frame of said pair of frames so as to obtain a predicted frame, said affine canonical transform representing said translation and rotation vectors. Details of the processing steps have been described above with reference to FIG. 1, and are incorporated here by reference.

The apparatus further 100 comprises processing means 120 configured to obtain translation and rotation vectors describing a motion of at least one object in said scenery between a pair of frames from among said sequence of frames; and apply an affine canonical transform to a first frame of said pair of frames so as to obtain a predicted frame, said affine canonical transform The processing means 120 may be implemented as one or more programmable components (e.g., a processor with appropriate software), configurable hardware components (e.g., FPGA), or dedicated hardware components (e.g., ASIC), or a combination thereof. The same component(s) may also perform other functions.

The processing means 120 may be further configured to: determine (1040) a residual between a second frame of said pair of frames and said predicted frame; this would allow the apparatus 100 to generate a compressed video stream comprising said first frame, a representation of said translation and rotation vectors, and said residual, wherein said first frame and/or said residual are compressed. For that purpose, the apparatus 100 may further comprise an output interface 130 adapted to output said compressed video stream.

The present invention also pertains to a computer program product comprising code means configured to cause a processor, when executed, to perform the steps of the method described above.

While the invention has been described hereinabove with reference to particular embodiments, this was done to clarify and not to limit the invention, the scope of which must be determined by reference to the accompanying claims. Features that have been described as parts of embodiments of the method according to the present invention may be applied mutatis mutandis with the same technical effect to embodiments of the apparatus according to the present invention, and vice versa.

The invention claimed is:

1. A computer-implemented method for compensating motion for a digital holographic video stream, the method comprising:
   obtaining a sequence of frames representing consecutive holographic images of a scenery;
   obtaining translation and rotation vectors describing a relative motion of at least one object in said scenery between a pair of frames from among said sequence of frames; and
   applying an affine canonical transform to a first frame of said pair of frames so as to obtain a predicted frame, said affine canonical transform representing said translation and rotation vectors.

2. The method according to claim 1, wherein said applying of said affine canonical transform comprises:
   applying a Fourier transform to at least a part of said first frame;
   applying a first operation to said Fourier-transformed part of said first frame;
   applying an inverse Fourier transform to said Fourier-transformed part of said first frame to which said first operation has been applied; and
   applying a second operation to said inversely Fourier-transformed part of said first frame.

3. The method according to claim 2, wherein applying said first operation or applying said second operation comprises applying an all-pass filter.

4. The method according to claim 1, further comprising:
   determining a residual between a second frame of said pair of frames and said predicted frame.

5. The method according to claim 4, further comprising:
   outputting a compressed video stream comprising said first frame, a representation of said translation and rotation vectors, and said residual, wherein at least one of said first frame or said residual is compressed.

6. The method according to claim 5, wherein at least one of said first frame or said residual is compressed using a conventional video encoding algorithm.

7. The method according to claim 6, wherein said conventional video encoding algorithm is H.265/HEVC.

8. A non-transitory computer program product comprising machine-executable instructions that, when executed, cause a processor to perform the method recited in claim 1.

9. An apparatus for compensating motion for a digital holographic video stream, the apparatus comprising:
   a video input interface adapted to receive a sequence of frames representing consecutive holographic images of a scenery; and
   processing means configured to:
      obtain translation and rotation vectors describing a relative motion of at least one object in said scenery between a pair of frames from among said sequence of frames; and
      apply an affine canonical transform to a first frame of said pair of frames so as to obtain a predicted frame, said affine canonical transform representing said translation and rotation vectors.

10. The apparatus according to claim 9, wherein said processing means is further configured to:
    determine a residual between a second frame of said pair of frames and said predicted frame;
    and wherein the apparatus further comprises:
       an output interface adapted to output a compressed video stream comprising said first frame, a representation of said translation and rotation vectors, and said residual, wherein at least one of said first frame or said residual is compressed.

11. A method of using the apparatus of claim 9 to apply global motion compensation on the digital holographic video stream for display through a holographic virtual reality or augmented reality headset, said holographic virtual reality or augmented reality headset comprising a motion sensor, wherein said relative motion of said at least one object in said scenery is a global motion induced by a user's head movements, the method comprising:
    obtaining said translation and rotation vectors from measurements of said motion sensor.

12. The method according to claim 2, further comprising:
    determining a residual between a second frame of said pair of frames and said predicted frame.

13. The method according to claim 12, further comprising:
    outputting a compressed video stream comprising said first frame, a representation of said translation and rotation vectors, and said residual, wherein at least one of said first frame or said residual is compressed.

14. The method according to claim 13, wherein at least one of said first frame or said residual is compressed using a conventional video encoding algorithm.

15. The method according to claim 14, wherein said conventional video encoding algorithm is H.265/HEVC.

16. The method according to claim 3, further comprising:
   determining a residual between a second frame of said pair of frames and said predicted frame.

17. The method according to claim 16, further comprising:
   outputting a compressed video stream comprising said first frame, a representation of said translation and rotation vectors, and said residual, wherein at least one of said first frame or said residual is compressed.

18. The method according to claim 17, wherein at least one of said first frame or said residual is compressed using a conventional video encoding algorithm.

19. The method according to claim 18, wherein said conventional video encoding algorithm is H.265/HEVC.

20. A method of using the apparatus of claim 10 to apply global motion compensation on the digital holographic video stream for display through a holographic virtual reality or augmented reality headset, said holographic virtual reality or augmented reality headset comprising a motion sensor, wherein said relative motion of said at least one object in said scenery is a global motion induced by a user's head movements, the method comprising:
   obtaining said translation and rotation vectors from measurements of said motion sensor.

* * * * *